Oct. 22, 1957 N. FELICI 2,810,878
SYSTEM OF REGULATING THE OUTPUT POTENTIAL OF
AN ELECTROSTATIC MACHINE
Filed Jan. 25, 1956 3 Sheets-Sheet 1

INVENTOR
Noel Felici
By
George V. Casey
ATTORNEY

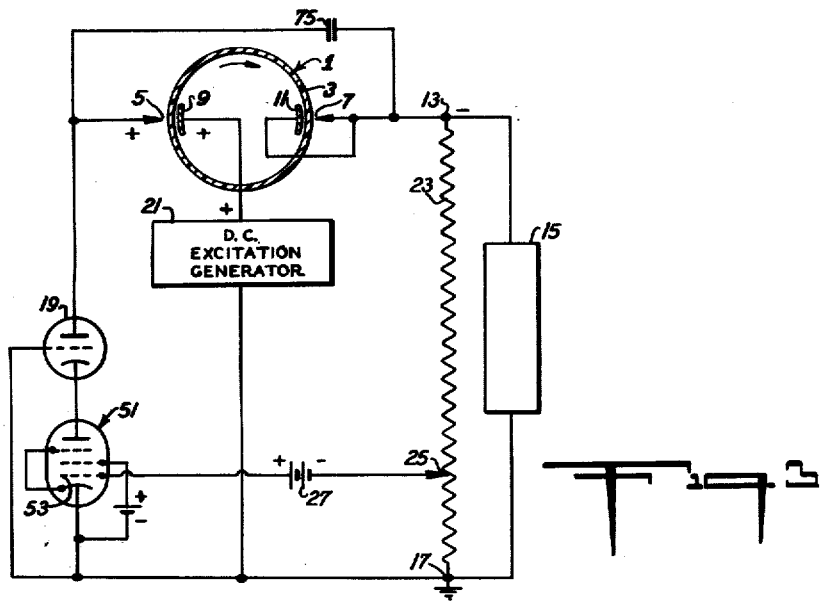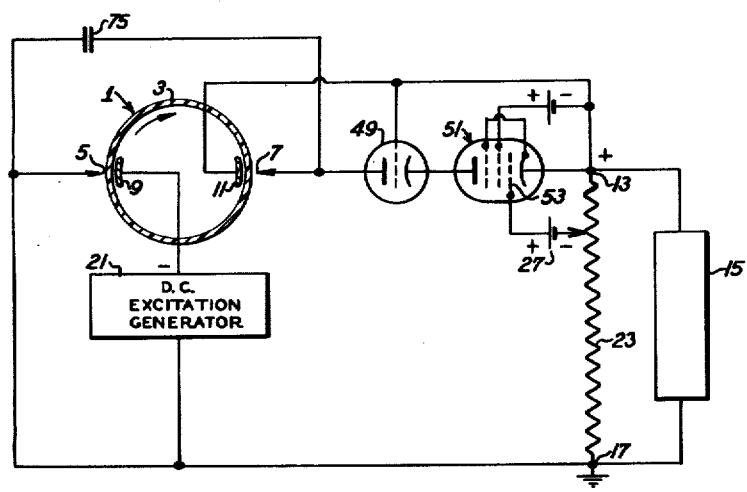

INVENTOR
Noel Felici
BY George Hooey
ATTORNEY

United States Patent Office 2,810,878
Patented Oct. 22, 1957

2,810,878

SYSTEM OF REGULATING THE OUTPUT POTENTIAL OF AN ELECTROSTATIC MACHINE

Noel Felici, Grenoble, France

Application January 25, 1956, Serial No. 561,203

Claims priority, application France January 28, 1955

26 Claims. (Cl. 322—2)

This invention relates to a system for electrostatic generation and more especially to a system for regulating the output potential of electrostatic generating apparatus. The invention especially relates to a system and apparatus for regulating the output potential of an electrostatic generator in response to variations of this output potential due to variations in the load or other cause.

It has been proposed heretofore to regulate the output potential of an electrostatic generator in response to variations in this output potential by controlling the excitation of the generator which promotes the development of the electrostatic charges carried by a conveyor and delivered at the output terminal of the generator. In an electrostatic generator having a conveyor of insulating material and an input ionizer from which to the surface of the conveyor charges are transferred to be collected at a collector or output ionizer, it has been proposed heretofore to vary the potential difference between the input ionizer and an inductor member disposed in field supporting relation to the input ionizer in response to variations of the potential at the output terminal of the generator. A system of regulation of this type is described in the application of Roger Morel, Serial No. 533,581, filed September 12, 1955.

It is an object of the present invention to provide an improved system and apparatus for controlling and regulating the output potential of an electrostatic generator.

It is a further object of the invention to provide an improved system of regulating the output potential of an electrostatic generator which with simple modification may effect such regulation for either negative or for positive output potentials.

It is another object of the invention to utilize conventional devices, such as electronic devices, for effecting the regulation.

The invention is particularly concerned with electrostatic generators for producing high output potential. Such generators within the scope of the invention may be those which have a conductive conveyor or those which have a conveyor of insulating material. In such generators ordinarily an output electrode and an input electrode are provided. A conveyor for carrying the charges from the input to the output electrode also is provided. This conveyor and the electrodes are supported for movement of the conveyor, on the one hand, and the two electrodes, on the other hand, relative to each other in a given path of movement for conveying the electric charges on the conveyor along this path, the input and output electrodes being disposed adjacent this path and spaced along this path from each other. The electrodes are disposed in charge transferring relation to the conveyor for transferring between the respective electrodes and the conveyor charges conveyed by the conveyor concomitantly with developing the desired differences of potential between the output electrode and the input electrode.

In general, the electrostatic generators of the invention having either an insulating or a conductive conveyor utilize an inductor member disposed adjacent and in disposed relation to the input electrode and cooperating therewith to support a field between the inductor member and the input electrode when, as by connection of a suitable exciter generator across said inductor member and the input electrode, a difference of potential is developed between the inductor member and the input electrode, this field promoting the transfer of charges from the input electrode to the conveyor. Similarly, ordinarily an inductor member is disposed in opposed relation to the output electrode for supporting an electric field between this output inductor member and the output electrode to promote the transfer of charges from the conveyor to the output electrode. In an electrostatic generator having a conveyor providing a wall of insulating material, the input and output electrodes are constituted by ionizers disposed adjacent and in spaced relation to a given surface of the wall of the conveyor, the respective inductor members being disposed at the opposite face of the conveyor wall, the conveyor and the electrodes being supported for movement relative to each other parallel to the wall. In a conductive conveyor generator the charges may be transferred by contact of a conductive element connected to the conveyor respectively with conductive input and output electrodes when the conveyor is in a predetermined inductive relation respectively to the input and output inductor members.

It is a characteristic of an electrostatic generator of the type to which the invention relates, when an excitation field of constant intensity is maintained between the input inductor member and the opposed input electrode or ionizer and with suitable limitation of the leakage of charges by the provision of proper insulation, that in the operation of the generator the potential at the output electrode will tend to increase continuously unless the charges are removed at the output electrode, as through a load circuit. It is recognized, if limitation of the output potential is to be accomplished, that it is necessary suitably to modify the excitation field at the input electrode to limit the charges which are transferred from the input electrode to the conveyor to be delivered to the output electrode. As above indicated, it has been proposed to accomplish such modification of the field by controlling the potential difference between the input electrode and the input inductor member in a predetermined relation to a potential difference proportional to the potential difference between the output electrode or an output terminal and the input electrode of the generator. The delivery of charges to the output terminal of the generator thereby is controlled to regulate the output potential.

It is a feature of the present invention that the output potential, or the difference of potential between the output terminal and the input electrode, is regulated by controlling the flow of charges between a given one of the electrodes and the conveyor. To this end a charge conducting device is connected in the load circuit connected between the output electrode and the input electrode of the generator. This charge conducting device is provided with means which is operable for varying the flow of charges through the device in a predetermined relation to variations in the potential difference between two different points in the load circuit. The disposition of the charge conducting device in the circuit is such that the charges flowing through the device also flow to or from a given one of the two electrodes of the electrostatic generator, so that the variation of the flow through the charge conducting device is effective to vary the flow of charges transferred between the given electrode and the conveyor of the electrostatic generator, means for developing an electric field adjacent the given electrode being connected in parallel with the portion of the load circuit in which the charge conducting device is disposed, so that the electric field is varied in response to variations of the charges flowing through the charge conducting device and in a predetermined relation to the difference of potential between the two different points in the load circuit.

In a practical mebodiment of the invention which makes possible the use of conventional devices in the system, an electronic device having an anode and a cathode and a grid is utilized and is connected in the load circuit with the anode cathode in series with the given electrode of the electrostatic generator, so that the charges delivered to or conducted from the given electrode and transferred between the given electrode and the conveyor pass through the electronic device across the anode and cathode thereof. In order to accomplish the regulation, by suitable means a selected potential difference is provided which is in the predetermined relation to the difference in potential between the two different points of the circuit. These two points, for example, may be the output terminal of the machine and a point in the return portion of the load circut that is connected to the input electrode of the generator. The potential differences between these two different points in a given embodiment may be the potential difference taken across the load in the load circuit. The selected potential difference above mentioned may be secured by utilizing the drop across a fractional portion of a resistance connected between the two different points of the circuit referred to. The selected potential difference preferably is connected through means providing an additive or subtractive potential difference and through amplifying means across the grid and cathode of the electronic device, so as to modify the potential to secure a suitable potential difference to be applied across the grid cathode, having regard to the characteristics of the conventional electronic device used. Such an electronic device may be a triode and the description will be given of a system utilizing a triode as the charge conducting device.

As will be more clearly understood from the description to follow in connection with the drawings, the triode may be disposed either in series with the input electrode or ionizer or it may be disposed in series with the output electrode or ionizer of the generator. When the triode is disposed in series with the input electrode, that is, upstream in the load circuit with respect to the input electrode of the electrostatic generator, it is requisite for proper operation of the generator that it be so disposed in the circuit that the means for developing the field adjacent the input electrode, such as an excitation generator connected to the input inductor for producing a potential difference between the input inductor member and the input electrode, shall be connected in parallel with the portion of the circuit in which the triode connected in series with the input electrode is disposed.

If the triode is disposed in series with the output electrode it is requisite for proper operation of the generator in accordance with the invention that the triode shall be disposed in the circuit between the output electrode and the output terminal of the generator at which the potential is to be regulated, that is, downstream in the load circuit with respect to the output electrode but upstream with respect to the output terminal, a connection being established between this output terminal and the output inductor member of the generator in parallel with the portion of the circuit in which the triode is disposed to bring upon the output inductor member the variations of the potential of the output terminal.

In the embodiments of the invention referred to in the immediately preceding paragraphs the anode of the triode is connected to the given electrode, that is, the input electrode or the output electrode as the case may be.

The disposition in the load circuit of the conductive device, the electronic device or triode, may be the same in the system utilizing a conductive conveyor as the disposition in the system utilizing a conveyor of insulating material.

To improve stability and to take care of impulses of current in the case of rapid variation of the impedance of the load cricuit, a condenser may be connected across the input and output electrodes of the generator. If desired also, condensers may be provided at other points in the system, for example, across one or the other or both of the two portions of the resistance above mentioned which are at either side of the tap point at which connection from the resistance to the grid of the triode is established.

The objects and features of the invention will be more clearly understood from a consideration of the description to follow taken in connection with the drawings in which:

Fig. 3 shows a modification of the system of Fig. 1.

Fig. 4 shows a modification of the system of Fig. 2.

Figure 1:
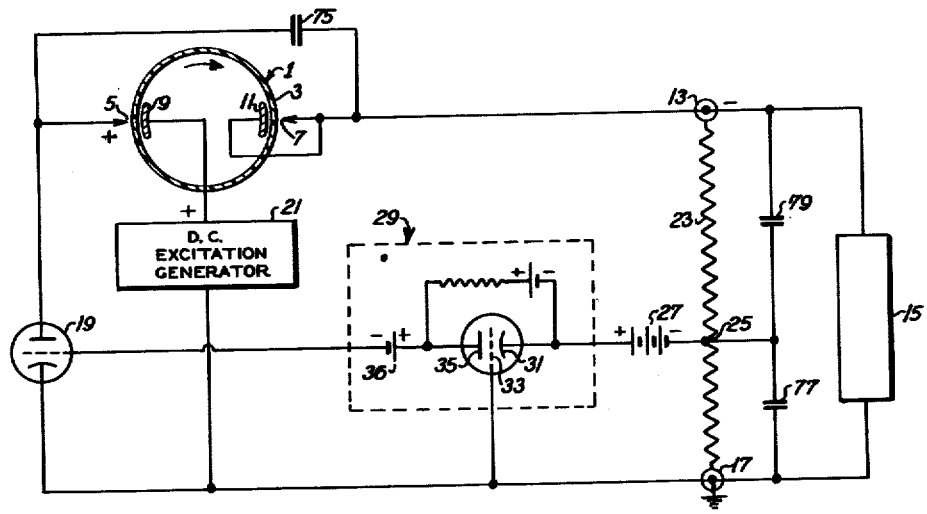
Fig. 1 shows a regulating system of an electrostatic generator having an insulating conveyor, the output potential being negative.

Fig. 1 shows a system of regulating an electrostatic generator 1 having a conveyor 3 of insulating material in the form of a hollow cylinder supported for rotation on the axis of the cylinder in the direction of the arrow. The generator is provided with an input ionizer 5 disposed adjacent and in spaced relation to the outer surface of the conveyor 3 and an output ionizer 7 disposed adjacent and in spaced relation to this outer surface of the conveyor and in spaced relation to the ionizer 5 about the circumference of the cylinder. An input or exciter inductor member 9 is disposed adjacent the inner surface of the conveyor in opposed relation to the ionizer 5 and an output or screen inductor member 11 is disposed adjacent the inner surface of the conveyor in opposed relation to the output ionizer 7. In the embodiment of Fig. 1 the ionizer 7 is connected conventionally to the inductor member 11 so that these members are at the same potential and the inductor member as a screen promotes the transfer of charges to the ionizer 7.

The output ionizer 7 is connected to an output terminal 13 to which the load 15 is connected, the other terminal of the load being connected through a return circuit to the opposite terminal 17 of the apparatus. In the embodiment being described and for the purpose of explanation it is assumed that terminal 17 is at ground potential but this potential may be any suitable reference potential. In the portion of the return circuit connecting between the terminal 17 and the input ionizer 5 a triode 19 is connetced with the anode thereof connected to the ionizer 5 and the cathode connected to the terminal 17. A unidirectional exciter generator 21 is connected between the grounded portion of the return circuit and the input inductor member 9. The generator 21 is capable of developing a substantially constant potential difference, so that the potential of the inductor member 9 is substantially constant with respect to ground. The sum of the potential difference between the inductor member 9 and the input ionizer 5 and the potential difference across the triode 19 in series with the input ionizer 5 thus is substantially constant.

In the embodiment of Fig. 1, which provides a system for regulating a negative output potential, for the purpose of controlling the flow of charges through the triode 19, a potential is applied to the grid of the triode which is effective to modify the potential difference between the inductor member 9 and the ionizer 5 and, therefore, to modify the electrical field between these members. To accomplish this a resistance 23 is connected between the output terminal 13 at negative potential and the grounded terminal 17, this resistance having a resistivity sufficient to provide a potential drop thereacross corresponding in this particular embodiment to the potential drop across the load 15. Between a suitable point or tap 25 on the resistance 23 and the grid of the triode 19 a control circuit is provided which includes in series a source of constant unidirectional potential difference 27, which may be a battery, and an amplifier 29. The grid thus connected in the circuit provides means which is operable for varying the flow of the charges through the triode in a predetermined relation to the variations in the potential difference between the output terminal and the grounded terminal 17 of the circuit. The operation of regulation will be described more fully hereinafter.

Figure 2:
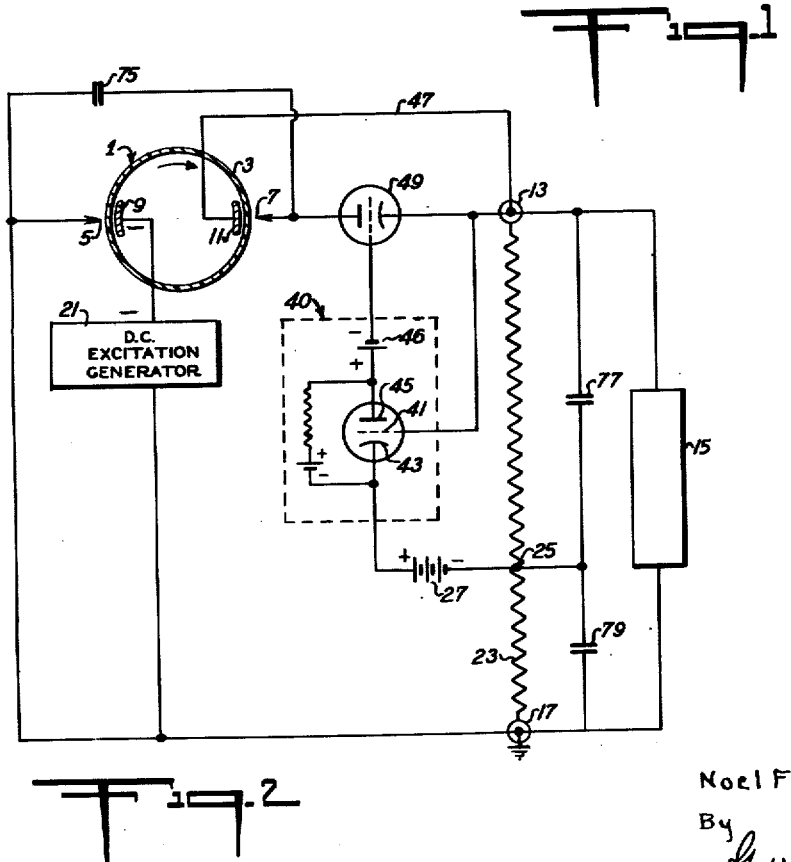
Fig. 2 shows a system of regulation of an electrostatic generator having an insulating conveyor, the output potential being positive.

Fig. 2 shows a system of regulating the positive output potential of an electrostatic generator 1 having a conveyor 3 and input and output ionizers 5, 7 with respectively opposed inductor members 9, 11 as in Fig. 1. In this embodiment the unidirectional exciter generator 21 also is connected between the inductor member 9 and ground. The input electrode or ionizer 5, however, is connected directly to ground, so that the constant potential difference developed by the generator 21 is applied between the ionizer 5 and the inductor member 9.

In the embodiment of Fig. 2, the triode utilized for regulating the output potential is connected in the load circuit between the output electrode or ionizer 7 and the output terminal 13, the anode of the triode 49 being connected to the ionizer 7 and the cathode being connected with the terminal 13. The output or screen inductor member 11 is connected by the connection 47 to the output terminal 13, so that this inductor member is maintained at the output potential.

In Fig. 2, the control circuit is connected from the point of connection or tap 25 on the resistance 23 through the battery 27 to the cathode 43 of an amplifier 40. The anode 45 of the amplifier tube is connected through battery 46 providing constant potential and predetermined polarity to the grid of the triode 49. The grid 41 of the amplifier tube is connected to the output terminal 13, so that the grid of this amplifier tube is at this output potential.

It will be understood in the embodiment of Fig. 2 that the triode 49 is disposed in the load circuit so as to conduct therethrough charges which are delivered to the output electrode or ionizer 7 from the conveyor 3. It also will be understood that the connection 47 is established in parallel with that portion of the circuit in which the triode 49 with its anode connected to the output ionizer 7 is disposed. This arrangement generically is the same as the disposition of the triode 19 in Fig. 1.

In explanation of the regulating operation of the system of the invention in the embodiment of Fig. 1, let it be assumed, for example, that the negative potential at terminal 13 decreases numerically, that is to say, this potential becomes more positive. The potential at the cathode 31 of the amplifier 29 becomes more positive. Since the grid 33 of the amplifier tube is connected to ground, this grid becomes more negative relative to the cathode 31 and the flow of charges through the amplifier tube thereby tends to be reduced with a corresponding increase in the potential drop across the tube between the anode 35 and the cathode 31. The anode 35, therefore, tends to become more positive and the grid of the triode 19 thus becomes more positive, although at a more negative potential than the anode 35 by virtue of the battery 36 connected in this circuit. The internal resistance of the triode 19 thereby is decreased and a corresponding increase of flow of charges through the triode 19 may take place and reduction of the potential drop between the anode and cathode of the triode 19 is developed. Having regard to the constant potential difference provided by the generator 21, the potential difference between the input inductor 9 and the input ionizer 5 is increased and the flow of negative charges transferred to the conveyor from the input ionizer 5 is increased, these increased charges flowing through the triode 19 of decreased resistance. The charges transferred to the output ionizer 7 also are increased with a corresponding increase in the negative potential at the output terminal 13, thus restoring the desired negative output potential.

Similarly, it may be shown that an increase numerically of the negative potential at the output terminal 13 in Fig. 1 results in changes in the potentials of the grids of the amplifier and the triode and of the potential difference between the input ionizer 5 and the inductor member 9 which will effect a reduction of the charges delivered to the conveyor and conveyed thereby and delivered to the output terminal 13, with a corresponding reduction of the negative potential at this terminal. Thus, the system of the invention in the embodiment of Fig. 1 accomplishes the regulation of the negative output potential at the terminal 11.

In the embodiment of Fig. 2, if the positive potential at the terminal 13 decreases, for example, thus becoming more negative, the potential at the cathode 43 of the amplifier 40 becomes less negative with respect to the terminal 13 because the potential of the terminal 13 decreases more than the potential of the point 25 of the resistor 23. Since the grid 41 of the amplifier tube is connected to terminal 13, this grid becomes less positive with respect to the cathode 43 and the internal resistance of the tube is increased and the flow of the charges through the amplifier tube thereby tends to be reduced with a corresponding increase in the potential drop across the amplifier tube between the anode 45 and the cathode 43 thereof. The anode 45, therefore, tends to become more positive with respect to the terminal 13 and the grid of the triode 49 thus becomes more positive with respect to the terminal 13, although at a more negative potential with respect to the terminal 13 than the anode 45 by virtue of the battery 46 connected in this circuit. A corresponding increase in the flow of charges through the triode 49 may take place and reduction of the potential drop between the anode and the cathode of the triode thus is developed. This results in a decrease of the potential difference between the screen inductor member 11 and the output ionizer 7.

Due to the connection of the triode 49 in the manner shown in Fig. 2, the ionizer 7 is at a higher positive potential than the potential of the screen inductor member 11 which is connected to the terminal 13 by the connection 47. The field created between ionizer 7 and inductor member 11, therefore, tends to oppose the transfer of charges between the conveyor 3 and the ionizer 7. Charges, however, are transferred from the conveyor to the ionizer 7 by virtue of the build up of potential in the movement of the conveyor between the input ionizer 5 and the output ionizer 7. In the regulating operation a smaller difference of potential between the ionizer 7 and the screen inductor 11 results in a higher flow of charges to the output terminal 13 to increase the positive potential at this terminal which in this example was assumed to decrease, so as to restore the desired output potential.

In the embodiment of Fig. 2, the direct current excitation generator 21 maintains a constant potential difference between the input ionizer 5 and the input inductor member 9, thus tending to effect a constant transfer of charges from the ionizer 5 to the conveyor 3. The amount of these charges capable of being transferred, as determined by this potential difference is arranged to be in excess of the maximum amount of charges required to be transferred from the conveyor to the output ionizer 7.

Under load conditions producing constant output current, the excess of charges carried by the conveyor and not removed at the output ionizer 7 is carried back by the conveyor to the region of the input ionizer 5. These excess charges being positive act in this region to repel positive charges which otherwise would be transferred from the ionizer 5 to the conveyor under the influence of the inductor member 9. The ionizer 5 and inductor member 9, however, are effective to transfer to the conveyor sufficient charges, generally equal to those removed at the ionizer 7, to provide a constant layer of a maximum amount of charges on the conveyor as it moves between the input ionizer 5 and the output ionizer 7.

Whenever the amount of charges transferred from the conveyor to the ionizer 7 is increased by the operation of the regulating system of Fig. 2, the amount of excess charges carried back by the conveyor is reduced and the ionizer 5 and inductor member 9 are effective to transfer more positive charges to the conveyor to make up for the increase of charges transferred to the ionizer 7 and to replenish the layer on the conveyor. When, on the other hand, the amount of charges transferred to the ionizer 7 is reduced, the excess charges carried back by the conveyor is increased and these increased excess charges repel charges which otherwise would be transferred from the ionizer 5 to the conveyor so that the amount of charges in the layer on the conveyor is maintained substantially constant.

It will be further understood that the system shown and described in connection with Fig. 2, upon increase of the positive potential at the terminal 13, will operate in a manner similar to that described for reduction of the potential at this terminal but with suitable changes in the potentials at the grids of the amplifier 40 and of the triode 49 to reduce the potential at the terminal 13 and restore this potential to the desired operating potential.

In Fig. 3 is shown a system corresponding to that of Fig. 1 in which the generator delivers negative charges to the output terminal 13, like parts in the two systems having the same reference numerals. In the system of Fig. 3, however, the grid of the triode 19 is connected to the terminal 17 which is at ground potential. The cathode of the triode 19 is connected to the anode of a pentode 51 of conventional type which serves as the amplifier, the control grid 53 of the pentode being connected to the positive terminal of the battery 27 the negative terminal of which is connected to the point of connection or tap 25 on the resistance 23. Thus, it will be understood that the connection from the tap 25 through the amplifier in Figs. 1 and 3 connects the portion of the resistance 23 between the tap and the terminal 17 at ground potential in a circuit connected across the grid and cathode of the triode to provide the selected potential difference above referred to in a predetermined relation to the drop across the resistance and to the output potential to secure the requisite control of the field at the input electrode or ionizer 5 to effect the regulation above described.

The system of Fig. 4 is similar to that of Fig. 2, like parts having the same reference numerals. The grid of the triode 49 disposed in the circuit between the output electrode or ionizer 7 and the output terminal 13, however, is connected to the output terminal 13 in Fig. 4, whereas in Fig. 2 the cathode of the triode 49 is connected to this output terminal. In Fig. 4 the cathode of the triode 49 is connected to the anode of the amplifier 51 the control grid 53 of which is connected through the battery 27 to the tap 25 on the resistor 23. In Figs. 2 and 4 it will be understood that the connection from the tap 25 through the amplifier is effective to connect the grid and cathode of the triode 49 in a circuit connected across the portion of the resistance disposed between the tap 25 and the output terminal 13 to provide a selected potential difference in a predetermined relation to the output potential difference that is brought upon the grid cathode of the triode to vary the flow of charges through the triode 49 to control the output potential as described.

Figure 5:
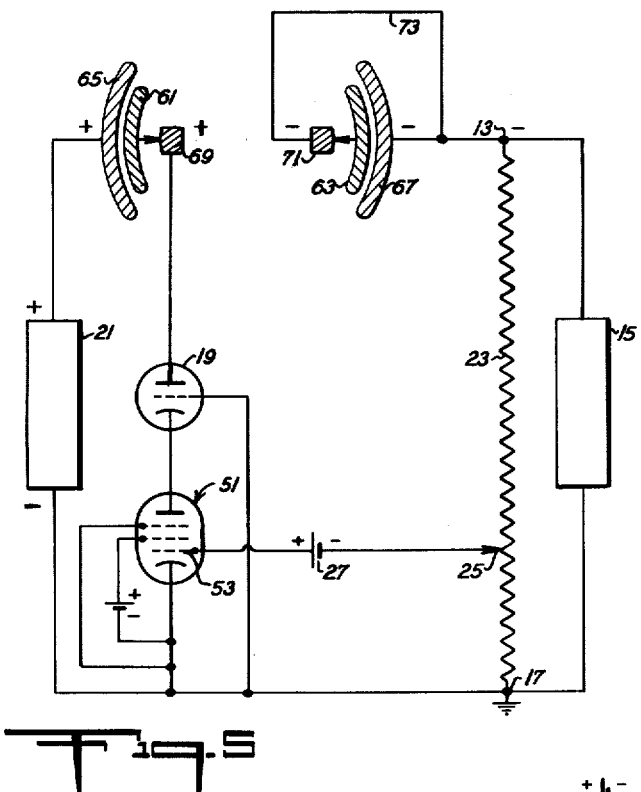
Fig. 5 shows a regulating system for an electrostatic generator having a conductive conveyor, the output potential being negative.

In Fig. 5 is shown a system in which an electrostatic generator is provided with conductive conveyors 61, 63 in the form of cylindrical segments supported for rotation on the axis of the cylinder, these conveyors in this embodiment by way of example being disposed diametrically opposite each other with respect to the axis of rotation. In the position shown in Fig. 5, the conveyors 61, 63 respectively are disposed in full inductive relation to inductor members 65, 67. The inductor member 65 as the input or exciter inductor member is maintained at a predetermined positive potential by the unidirectional exciter generator 21 connected between inductor member 65 and ground. The inductor member 67 as the output or screen inductor member is connected to the output terminal 13 and to the output electrode 71.

The conveyor 61 in the position shown in Fig. 5 is in conductive connection with the input electrode or contact 69 to which the anode of the triode 19 is connected, this triode being connected in the load circuit between the output terminal 13 and the input electrode 69. The grid of the triode 19, similarly to Fig. 3, is connected to ground. The cathode of the triode 19, similarly to Fig. 3, is connected to the anode of an amplifying pentode 51. The cathode of this amplifying tube also is connected to ground, the control grid 53 being connected to the positive terminal of the battery 27 the negative terminal of which is connected to the tap 25 on the resistor 23 which is connected between the output terminal 13 and the other terminal 17 of the system which is grounded. The load 15, as in Fig. 3, is connected across the terminals, 13, 17.

Upon rotation of the conveyor 61 in the direction of the arrow, charges received by this conveyor through the triode 19, under the influence of the field developed between the exciter inductor member 65 and the conveyor 61 in the position shown connected to the contact 69, will be carried by the conveyor to the position of the conveyor 63, Fig. 5, in which position the charges carried by the conveyor 61 will be conductively transferred to the electrode 71 which is connected by the connection 73 to the output terminal 13.

It will be understood that the charges thus flowing to the conveyor 61 will be controlled by the operation of the triode 19 and the amplifier 51 as determined by the potential drop across the portion of the resistor 23 between the tap 25 and the terminal 17 at ground potential in the same manner as described in Figs. 1 and 3. It will be understood further with respect to the field developed between the input inductor 65 and the conveyor 61, the conveyor 61 in the position shown being in conductive connection with the contact 69 and the conveyor and contact constituting the input electrode, will be controlled in the same manner as described in connection with Figs. 1 and 3 so that the negative output potential at the terminal 13 will be regulated with respect to charges carried by the conveyor 61.

When the conveyor 63 rotating in the direction of the arrow about the axis reaches the position of the conveyor 61, similar action will take place with respect to conveyor 63 and charges received by the conveyor 63 through the triode 19 will be carried by the conveyor to the output contact or electrode 71 and to the output terminal 13 with corresponding regulation of the negative output potential.

Figure 6:
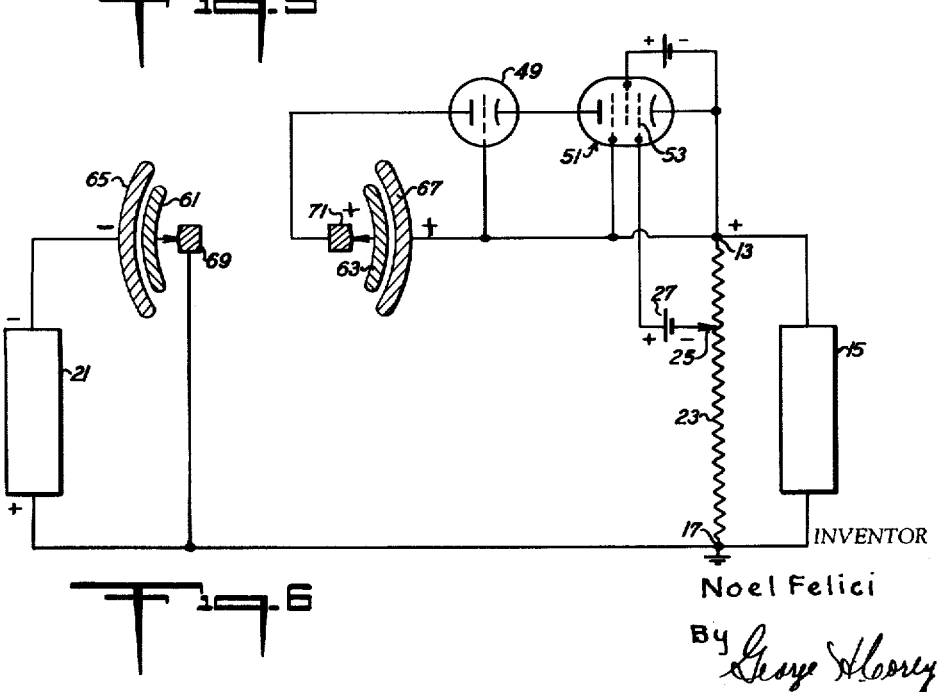
Figs. 6 shows a regulating system for an electrostatic generator having a conductive conveyor, the output potential being positive.

In Fig. 6 is shown a system of regulating the positive output potential of an electrostatic generator having conductive conveyors 61, 63 and exciter inductor member 65 and output or screen inductor member 67, as well as electrodes or contacts 69, 71 the same described as in connection with Fig. 5.

In this embodiment, however, the unidirectional excitation generator 21 is connected directly across the exciter inductor member 65 and the input electrode or contact 69 to maintain a constant potential difference between the exciter inductor member 65 and the conveyor 61 in the position shown in Fig. 6. In this embodiment, moreover, the triode 49 is disposed in the portion of the load circuit connected between the output electrode 71 and the output terminal 13 which is to be maintained at the desired positive potential. Similarly to the system of Fig. 4, the amplifier 51 is connected with its anode connected to the cathode of the triode 49. The control grid 53 of the amplifier tube 51 is connected to the battery 27 connected to the tap 25 on the resistor 23, this resistor being connected between the output terminal 13 and the other terminal 17 of the system, the load 15 also being connected between the terminals 13 and 17. Thus, it will be understood that the system of Fig. 6 operates in the same manner as described in connection with Figs. 2 and 4, the charges being conveyed by the conductive conveyor 61, 63 from the position of conductive connection to the input electrode or contact 69 to the output electrode or contact 71, the charges being transferred to and from the conveyor when the conveyor respectively is in inductive relation to the input or exciter inductor member 65 and to the output or screen inductor member 67.

In each of the embodiments of Figs. 1 to 4 inclusive, condenser 75 is connected across the input and output electrodes of the electrostatic generator. This condenser, although not essential to the inventive concept, may be utilized to improve the stability of the generator and, on the other hand, may supply impulses of current in the case of rapid variation of the impedance of the load 15. If it is assumed, for example, that the potential of the output terminal 13 in Fig. 1 is negative 50 kv. and that of the input ionizer 5 is positive 15 kv., the condenser 75 is charged under a difference of potential of 65 kv.

If now the impedance of the load 15 decreases, the difference of potential between the terminals 13 and 17 of the system will decrease. If this potential difference decreases the 49 kv. and the potential of the input ionizer 5 decreases, for example, to 5 kv., the condenser having a capacity C will have at its terminals a difference of potential of 54 kv. after having lost a charge Q.

$$Q = (65-54) \ C \text{ coulombs}$$

This condenser thus immediately will start to deliver an impulse which the generator could have supplied only with a delay inherent in its operation due to the time necessary for conveying the charges from the input electrode or ionizer to the output electrode or ionizer in the rotation of the conveyor 3, as well as due to time delay factors involved in the devices used for the regulation of the system. The condenser 75 also may be effective to provide the requisite peak amplitude of the impulse in the event that the generator itself is incapable of doing so.

In any of the systems above described, condensers 77 and 79 respectively may be connected across the portion of the resistor 23 which provides the selected potential difference and the remaining portion of this resistor, as shown in Figs. 1 and 2. Either or both of these condensers may be utilized. While the condensers 77, 79 are not indispensable they may be used to compensate distortions due to the amplifying system or to make amplification factor dependent upon the frequency.

For instance, an increase in the value of the capacitance of condenser 79 will increase the response to high frequencies and, therefore, improve the delivery of short impulses of current needed in the case of a very rapid change in the impedance of the load circuit.

As an example of a practical embodiment of the invention, apparatus for regulating the output potential of an electrostatic generator of the type disclosed in the French Patent 1,051,430, published January 15, 1954, in accordance with the system of Fig. 1 has been constructed of which the following are the characteristic data.

| | |
|---|---|
| Rotor length | 18 cm. (7.1"). |
| Rotor diameter | 15 cm. (5.9"). |
| Output potential | 150 kv. |
| Maximum output current | 2 milliamperes. |
| Excitation generator | 30 kv. |
| Triode type TH 100 capable of withstanding a direct potential of | 20 kv. |
| Amplifier using a pentode. | |
| Standard of potential, battery | 90 volts. |
| Condenser across generator capable of withstanding | 5,000 micro-microfarads, 200 kv. |
| Potential divider (resistor) | 3,000 megohms. |
| Condenser 77 | 200 micro-microfarads. |
| Condenser 79 | 50 micro-microfarads. |

The variation of the output potential of this apparatus was of the degree of 20 volts when the impedance of the load was constant and about 500 volts with abrupt variations of this impedance. In these two cases the stability of the system was of the degree of $\frac{1}{10,000}$ and $\frac{1}{300}$ respectively of the output potential.

In another practical embodiment of the system, comprising the same elements as those of the example just given but arranged in accordance with Fig. 2, the stability of operation was assured with the same precision.

The amplification system utilized in a practical embodiment of the invention should have a "band width" extending from zero to a few hundred cycles per second and should not introduce in this range any substantial phase shift. The amplification system, for example, may comprise one tube or a plurality of tubes in series.

In the above description and in the claims, where reference is made to a "connection" or an "electrical connection" to or between elements of the organization it will be understood that such connections may involve connections or circuits which provide for transfer of electric charges or the flow of current between elements or the bringing of the effect of a potential of a given point or of a potential difference between two points upon an element or between elements of this organization, and these terms are not necessarily to be construed as direct conductive connections.

The invention is not limited to the particular embodiments disclosed or to the specific devices shown and described, although preferably utilizing electronic devices for the elements of the regulating system. The invention is not limited, moreover, to conditions of operation such as those represented by the data given but is applicable generally to electrostatic generating systems utilizing generators having either a conveyor of insulating material or a conveyor of conductive material, it being desired to deliver an output potential as constant as possible.

In place of the portion of the resistor other than that which in the system described provides the selected potential difference an electrostatic device cooperating with the portion of the resistance which provides this selected potential difference may be used which is arranged and which functions generally in the manner disclosed in the application of Roger Morel, Serial No. 533,518, above referred to. In that application this electrostatic device is similar to an electrostatic voltmeter having a rotating element.

Other variations may be made without departing from the scope of the invention as disclosed herein and as set forth in the claims.

I claim:

1. In an electrostatic generating system, the combination with an electrostatic generator having a conveyor, an output electrode, and an input electrode, said conveyor and said electrodes being supported for movement of said conveyor and said electrodes relative to each other in a given path of movement for conveying electric charges carried by said conveyor along said path, said input and output electrodes being disposed adjacent said path of movement and spaced along said path from each other, said electrodes being disposed in charge transferring relation to said conveyor for transferring between the respective electrodes and said conveyor charges conveyed by said conveyor concomitantly with developing a difference of potential between said output electrode and said input electrode, of a load circuit connected between said output electrode and said input electrode, means connected to said load circuit and providing a selected potential difference having a predetermined relation to the difference of potential between two different points in said load circuit, a charge conducting device connected in said load circuit for conducting through said device charges transferred between a given electrode and said conveyor, said device being provided with means operable for varying the flow of said charges through said device and operatively connected to said means providing said selected potential difference for varying the flow of charges through said device in a predetermined relation to variations in said selected potential difference, and means connected in parallel with the portion of said load circuit in which said charge conducting device is disposed and cooperating with said given electrode for developing an electric field adjacent said given electrode that is varied in response to variation of charges flowing through said device in a predetermined relation to said variations in said selected potential difference.

2. In an electrostatic generating system, the combination with an electrostatic generator having a conveyor, an output electrode, and an input electrode, said conveyor and said electrodes being supported for movement of said conveyor and said electrodes relative to each other in a given path of movement for conveying electric charges carried by said conveyor along said path, said input and output electrodes being disposed adjacent said path of movement and spaced along said path from each other, said electrodes being disposed in charge transferring relation to said conveyor for transferring between the respective electrodes and said conveyor charges conveyed by said conveyor concomitantly with developing a difference of potential between said output electrode and said input electrode, of a load circuit connected between said output electrode and said input electrode, an output terminal in said circuit, means connected to said load circuit and providing a selected potential difference having a predetermined relation to the difference of potential between said output terminal and a predetermined point in said load circuit, a charge conducting device connected in said load circuit in series with a given electrode for conducting through said device charges transferred between said given electrode and said conveyor, said device being provided with means operable for varying the flow of charges through said device and operatively connected to said means providing said selected potential difference for varying the flow of charges through said device in a predetermined relation to said selected potential difference, and means connected in parallel with the portion of said load circuit in which said charge conducting device and said given electrode in series therewith are disposed for developing an electric field adjacent said given electrode having an intensity varying in a predetermined relation to variations in said selected potential difference to vary the transfer of charges between said given electrode and said conveyor in a predetermined relation to variations of said selected potential difference and of said potential difference between said output terminal and said predetermined point in said load circuit.

3. In an electrostatic generating system, the combination as defined in claim 2 in which said means providing said selected potential difference is connected to said charge conducting device and to said means for developing said electric field so as to vary said field in inverse relation to the variations of said selected potential difference.

4. In an electrostatic generating system, the combination with an electrostatic generator having a conveyor, an output electrode, and an input electrode, said conveyor and said electrodes being supported for movement of said conveyor and said electrodes relative to each other in a given path of movement for conveying electric charges carried by said conveyor along said path, said input and output electrodes being disposed adjacent said path of movement and spaced along said path from each other, said electrodes being disposed in charge transferring relation to said conveyor for transferring between the respective electrodes and said conveyor charges conveyed by said conveyor concomitantly with developing a difference of potential between said output electrode and said input electrode, of a load circuit connected between said output electrode and said input electrode, an output terminal in said circuit, means connected to said load circuit and providing a selected potential difference having a predetermined relation to the difference of potential between said output terminal and a predetermined point in said load circuit, an electronic device having an anode and a cathode and a grid, said anode and cathode in series being connected in said load circuit in series with a given one of said electrodes for conducting through said electronic device across said anode cathode charges transferred between said given electrode and said conveyor, means electrically connecting said grid and cathode to said means providing said selected potential difference for developing across said grid cathode a potential difference varying in a predetermined relation to variations in said selected potential difference to vary the flow of charges flowing through said electronic device, and means connected in parallel with the portion of said load circuit in which said anode cathode of said electronic device connected in series with said given electrode are disposed and cooperating with said given electrode for developing an electric field adjacent said given electrode that varies in response to said variations of charges flowing through said electronic device in a predetermined relation to said variations in said selected potential difference.

5. In an electrostatic generating system, the combination as defined in claim 1 in which said means connected in parallel with said portion of said load circuit in which said charge conducting device is disposed comprises an inductor member disposed adjacent said path of movement in opposed relation to said given electrode, and means connected to said given electrode and to said inductor member for producing a difference of potential therebetween for supporting said field adjacent said given electrode to determine the transfer of charges between said given electrode and said conveyor.

6. In an electrostatic generating system, the combination as defined in claim 1 in which said charge conducting device is connected in said load circuit in series with said input electrode for conducting through said device to said input electrode charges transferred from said input electrode to said conveyor.

7. In an electrostatic generating system, the combination as defined in claim 6 which comprises an input inductor member disposed adjacent said path of movement in opposed relation to said input electrode, said means connected in parallel with said portion of said circuit comprising means connected to said input inductor member for producing a difference of potential between said input electrode and said inductor member for supporting said field adjacent said input electrode determining transfer of charges from said input electrode to said conveyor.

8. In an electrostatic generating system, the combination as defined in claim 1 in which said charge conducting device is an electronic device having an anode and a cathode and a grid, said anode and cathode in series being connected in said load circuit in series with said input electrode for conducting through said electronic device to said input electrode charges transferred to said conveyor, said grid and cathode being electrically connected to said means providing said selected potential difference for developing across said grid and cathode a potential difference varying in a predetermined relation to variations of the difference of potential between said two different points in said load circuit.

9. In an electrostatic generating system, the combination as defined in claim 1 in which said charge conducting device is connected in said load circuit in series with said output electrode for conducting through said device from said output electrode charges transferred to said output electrode from said conveyor.

10. In an electrostatic generating system, the combination as defined in claim 9 which comprises an output inductor member disposed adjacent said path of movement in opposed relation to said output electrode, an output terminal in said load circuit, connected to said output inductor member, said charge conducting device being disposed in said circuit between said output electrode and said output terminal.

11. In an electrostatic generating system, the combination as defined in claim 1 in which said charge conducting device is an electronic device having an anode and a cathode and a grid, said anode and cathode in series being connected in said load circuit in series with said output electrode for conducting through said electronic device from said output electrode charges transferred to said output electrode from said conveyor, said grid and cathode being electricially connected to said means providing said selected potential difference for developing across said grid and cathode a potential difference varying in a predetermined relation to variations of the difference of potential between said two different points in said load circuit.

12. In an electrostatic generating system, the combination as defined in claim 4 in which said means electrically connecting said grid and cathode to said means providing said selected potential difference comprises an amplifier for amplifying said selected potential difference.

13. In an electrostatic generating system, the combination as defined in claim 4 in which said means providing said selected potential difference comprises a resistance connected between said output terminal and said predetermined point in said load circuit, said means electrically connecting said grid and cathode to said means providing said selected potential difference being connected at a predetermined point on said resistance.

14. In an electrostatic generating system, the combination as defined in claim 13 which comprises an electronic amplifier of potential connected in a circuit between said predetermined point on said resistance and said electronic device for applying across said grid and cathode of said electronic device an amplified potential difference derived from said selected potential difference.

15. In an electrostatic generating system, the combination as defined in claim 4 in which said means electrically connecting said grid and cathode to said means providing said selected potential difference comprises a source of substantially constant unidirectional potential difference connected in series in a circuit connecting said grid and cathode to said means providing said selected potential difference with the polarity of said source of unidirectional potential difference in a given relation to the polarity at the point of connection to said means providing said selected potential difference.

16. In an electrostatic generating system, the combination with an electrostatic generator having a conveyor, an output electrode, and an input electrode, said conveyor and said electrodes being supported for movement of said conveyor and said electrodes relative to each other in a given path of movement for conveying electric charges carried by said conveyor along said path, said input and output electrodes being disposed adjacent said path of movement and spaced along said path from each other, said electrodes being disposed in charge transferring relation to said conveyor for transferring between the respective electrodes and said conveyor charges conveyed by said conveyor concomitantly with developing a difference of potential between said output electrode and said input electrode, of a load circuit connected between said output electrode and said input electrode, an output terminal in said circuit, means connected to said load circuit and providing a selected potential difference in a predetermined relation to the difference of potential between said output terminal and a predetermined point in said load circuit, an electronic device having an anode and a cathode and a grid, said anode and cathode in series being connected in said load circuit with said anode connected to a given one of said electrodes for conducting through said electronic device charges transferred between said given electrode and said conveyor, an inductor member disposed adjacent said path of movement in opposed relation to said given electrode, means connected in parallel with the portion of said load circuit in which said electronic device and said given electrode are disposed and connected to said inductor member for producing a difference of potential between said inductor member and said given electrode for supporting an electric field adjacent said given electrode determining said transfer of charges between said given electrode and said conveyor, and means electrically connected to said grid and cathode and to said means providing said selected potential difference for developing across said grid and cathode a potential difference varying in a predetermined relation to variations in said selected potential difference to vary said field adjacent said given electrode in a predetermined relation to variations of said potential difference across said grid and cathode and of said selected potential difference.

17. In an electrostatic generating system, the combination with an electrostatic generator having a conveyor, an output electrode, and an input electrode, said conveyor and said electrodes being supported for movement of said conveyor and said electrodes relative to each other in a given path of movement for conveying electric charges carried by said conveyor along said path, said input and output electrode being disposed adjacent said path of movement and spaced along said path from each other, said electrodes being disposed in charge transferring relation to said conveyor for transferring between the respective electrodes and said conveyor charges conveyed by said conveyor concomitantly with developing a difference of potential between said output electrode and said input electrode, of a load circuit connected between said output electrode and said input electrode, an output terminal in said circuit, means connected to said load circuit and providing a selected potential difference in a predetermined relation to the difference of potential between said output terminal and a predetermined point in said load circuit, an electronic device having an anode and a cathode and a grid, said anode and cathode in series being connected in said load circuit with said anode connected to said input electrode for conducting through said electronic device charges transferred from said input electrode to said conveyor, an inductor member disposed adjacent said path of movement in opposed relation to said input electrode, a unidirectional potential generator connected between said inductor member and the cathode of said electronic device in parallel with the portion of said load circuit in which said electronic device is disposed for supporting an electric field between said inductor member and said input electrode determining said transfer of charges from said input electrode to said conveyor, and means electrically connected to said grid and cathode and to said means providing said selected potential difference for developing across said grid and cathode a potential difference varying in a predetermined relation to variations in said selected potential difference to vary said field adjacent said input electrode in a predetermined relation to variations of said potential difference across said grid and cathode and of said selected potential difference.

18. In an electrostatic generating system, the combination with an electrostatic generator having a conveyor, an output electrode, and an input electrode, said conveyor and said electrodes being supported for movement of said conveyor and said electrodes relative to each other in a given path of movement for conveying electric charges carried by said conveyor along said path, said input and output electrodes being disposed adjacent said path of movement and spaced along said path from each other, said electrodes being disposed in charge transferring relation to said conveyor for transferring between the respective electrodes and said conveyor charges conveyed by said conveyor concomitantly with developing a difference of potential between said output electrode and said input electrode, of a load circuit connected between said output electrode and said input electrode, an output terminal in said circuit, means connected to said load circuit and providing a selected potential difference in a predetermined relation to the difference of potential between said output terminal and a predetermined point in said load circuit, an electronic device having an anode and a cathode and a grid, said anode and cathode in series being connected in said load circuit with said anode connected to said output electrode and with said cathode connected to said output terminal for conducting through said electronic device charges transferred to said output electrode from said conveyor, an inductor member disposed adjacent said path of movement in opposed relation to said output electrode, an electrical connection between said output terminal and said inductor member in parallel with the portion of said load circuit in which said electronic device is disposed for supporting an electrical field between said inductor member and said output electrode determining said transfer of charges to said output electrode from said conveyor, and means electrically connected to said grid and cathode and to said means providing said selected potential difference for developing across said grid and cathode a potential difference varying in a predetermined relation to variations in said selected potential difference to vary said field adjacent said output electrode in a predetermined relation to variations of said potential difference across said grid and cathode and of said selected potential difference.

19. In an electrostatic generating system, the combination as defined in claim 1 which comprises a condenser connected between said input electrode and said output electrode.

20. In an electrostatic generating system, the combination as defined in claim 4 in which said means providing said selected potential difference comprises a resistance connected between said output terminal and said predetermined point in said load circuit, said means electrically connecting said grid and cathode of said electronic device to said means providing said selected potential difference being connected at a predetermined point on said resistance, and a condenser connected across a selected one of the two portions of said resistance respectively disposed between said predetermined point on sadi resistance and said output terminal and between said predetermined point on said resistance and said predetermined point in said load circuit.

21. In an electrostatic generating system, the combination as defined in claim 4 in which said means electrically connecting said grid and cathode to said means providing said selected potential difference comprises an electronic amplifier having a cathode connected to a selected terminal of said system, the anode of said amplifier being connected to said cathode of said electronic device, the grid of said electronic device being connected to said selected terminal of said system.

22. In an electrostatic generating system, the combination as defined in claim 21 in which said means providing said selected potential difference comprises a resistance connected between said output terminal and said predetermined point in said load circuit, the control grid of said electronic amplifier being connected to a predetermined point on said resistance.

23. In an electrostatic generating system, the combination as defined in claim 1 in which said conveyor of said electrostatic generator is of insulating material, said electrodes being provided by ionizers respectively disposed in spaced relation to a given surface of said conveyor extending parallel to said path of movement.

24. In an electrostatic generating system, the combination as defined in claim 1 in which said conveyor of said electrostatic generator is of conductive material, said input and output electrodes being disposed adjacent said path of movement so as to establish conductive connection of said conveyor to said electrodes in succession in positions of said conveyor spaced along said path corresponding to said spaced position of said electrodes, and an inductor member disposed adjacent said path in inductive relation to said conveyor in the position of said conveyor in which said conductive connection is established to said input electrode.

25. In an electrostatic generating system the combination as defined in claim 2 in which said means providing said selected potential difference is connected to said charge conducting device and to said means for developing said electric field so as to vary said field in direct relation to the variations of said potential difference.

26. In an electrostatic generating system, the combination with an electrostatic generator having a conveyor, an output electrode, and an input electrode, said conveyor and said electrodes being supported for movement of said conveyor and said electrodes relative to each other in a given path of movement for conveying electric charges carried by said conveyor along said path, said input and output electrodes being disposed adjacent said path of movement and spaced along said path from each other, said electrodes being disposed in charge transferring relation to said conveyor for transferring between the respective electrodes and said conveyor charges conveyed by said conveyor concomitantly with developing a difference of potential between said output electrode and said input electrode, of a load circuit connected between said output electrode and said input electrode, means connected to said load circuit and providing a selected potential difference having a predetermined relation to the difference of potential between two different points in said load circuit, a charge conducting device connected in said load circuit for conducting through said device charges transferred between a given electrode and said conveyor, said device being provided with means operable for varying the effective resistance of said device to flow of charges through said device and operatively connected to said means providing said selected potential difference for varying said effective resistance in a predetermined relation to variations in said selected potential difference, and means connected in parallel with the portion of the load circuit in which said charge conducting device is disposed and cooperating with said given electrode for developing an electric field adjacent said given electrode that is varied in response to variations in said effective resistance of said charge conducting device varying in said predetermined relation to variations in said selected potential difference.

References Cited in the file of this patent

UNITED STATES PATENTS

| | | |
|---|---|---|
| 2,588,613 | Burrill et al. | Mar. 11, 1952 |
| 2,677,774 | Nygard | May 4, 1954 |

U. S. DEPARTMENT OF COMMERCE
PATENT OFFICE

CERTIFICATE OF CORRECTION

Patent No. 2,810,878                                                October 22, 1957

Noel Felici

It is hereby certified that error appears in the printed specification of the above numbered patent requiring correction and that the said Letters Patent should read as corrected below.

Column 1, line 68, for "differences" read -- difference --; line 72, and column 2, line 1, for "disposed" read -- opposed --; column 3, line 3, for "mebodiment" read -- embodiment --; column 15, line 55, for "sadi" read -- said --.

Signed and sealed this 15th day of April 1958.

(SEAL)
Attest:

KARL H. AXLINE                                                   ROBERT C. WATSON
Attesting Officer                                        Commissioner of Patents